US008868253B2

(12) United States Patent
Hashimoto et al.

(10) Patent No.: US 8,868,253 B2
(45) Date of Patent: Oct. 21, 2014

(54) BICYCLE COMMUNICATION ADAPTER

(75) Inventors: Akinori Hashimoto, Osaka (JP);
Tetsuya Matsumoto, Osaka (JP)

(73) Assignee: Shimano Inc., Osaka (JP)

( * ) Notice: Subject to any disclaimer, the term of this patent is extended or adjusted under 35 U.S.C. 154(b) by 183 days.

(21) Appl. No.: 13/547,673

(22) Filed: Jul. 12, 2012

(65) Prior Publication Data

US 2013/0030603 A1 Jan. 31, 2013

(30) Foreign Application Priority Data

Jul. 29, 2011 (JP) ................................. 2011-167758

(51) Int. Cl.
*G06F 19/00* (2011.01)
*G08C 19/16* (2006.01)
*H02J 4/00* (2006.01)
*B60L 15/00* (2006.01)
*H04B 3/54* (2006.01)
*B60L 3/00* (2006.01)
*B62M 25/08* (2006.01)

(52) U.S. Cl.
CPC ........... *B60L 3/0084* (2013.01); *B60L 2200/12* (2013.01); *B60L 15/00* (2013.01); *Y02T 90/16* (2013.01); *H04B 2203/5454* (2013.01); *H04B 2203/547* (2013.01); *H04B 3/548* (2013.01); *B62M 25/08* (2013.01)
USPC .............. 701/1; 307/38; 307/116; 340/12.32; 340/12.39; 455/574

(58) Field of Classification Search
None
See application file for complete search history.

(56) References Cited

U.S. PATENT DOCUMENTS

| | | | |
|---|---|---|---|
| 2006/0226879 A1* | 10/2006 | Kitamura | 327/94 |
| 2007/0149258 A1* | 6/2007 | Tokunaga | 455/574 |
| 2011/0267178 A1* | 11/2011 | Nishihara et al. | 340/12.39 |
| 2011/0310519 A1* | 12/2011 | Baba et al. | 361/91.1 |
| 2012/0253600 A1* | 10/2012 | Ichida et al. | 701/37 |
| 2012/0253601 A1* | 10/2012 | Ichida et al. | 701/37 |
| 2012/0253606 A1* | 10/2012 | Takamoto et al. | 701/48 |

FOREIGN PATENT DOCUMENTS

| | | |
|---|---|---|
| EP | 1 343 253 A1 | 9/2003 |
| EP | 1 357 678 A1 | 10/2003 |
| EP | 1 520 773 A1 | 4/2005 |
| JP | 2004-336483 | 11/2004 |
| KR | 10-0989678 | 10/2010 |

OTHER PUBLICATIONS

European Search Report of corresponding EP Application. No. 12 17 4803.2 dated Oct. 24, 2012.

* cited by examiner

*Primary Examiner* — Behrang Badii
*Assistant Examiner* — Demetra Smith-Stewart
(74) *Attorney, Agent, or Firm* — Global IP Counselors

(57) ABSTRACT

A bicycle communication adapter is provided with a voltage converting component, a signal converting component and a superimposing component. The voltage converting component is configured to convert a received voltage supplied from a bicycle electrical management system to a converted voltage suitable for at least one of a plurality of electric devices of a bicycle electrical system. The signal converting component is configured to convert a received signal outputted from a bicycle electrical management system into a converted signal compliant with a standard for power line communication. The superimposing component is configured to superimpose the converted signal converted by the signal converting component onto the converted voltage converted by the voltage converting component.

9 Claims, 5 Drawing Sheets

BICYCLE COMMUNICATION ADAPTER

CROSS-REFERENCE TO RELATED APPLICATIONS

This application claims priority under 35 U.S.C. §119 to Japanese Patent Application No. 2011-167758, filed Jul. 29, 2011. The entire disclosure of Japanese Patent Application No. 2011-167758 is hereby incorporated herein by reference.

BACKGROUND

1. Field of the Invention

This invention generally relates to a bicycle communication adapter. More specifically, the present invention relates to a bicycle communication adapter for a bicycle that can connect a bicycle electrical system in which a plurality of electric devices can be connected using power line communication to a management system configured to manage the bicycle electrical system.

2. Background Information

Regarding an electrical system having a plurality of electric devices installed in a vehicle, there is a known technology whereby the electric devices communicate through an electric power line connected to a battery of the vehicle (Japanese Laid-Open Patent Publication No. 2004-064405).

SUMMARY

The known technology does not disclose a communication adapter for supplying a signal from an external management system to the electrical system in order to check a state of the electric devices inside the vehicle or control the electric devices. Moreover, the known technology cannot supply electric power from the management system to an electric device not having a power supply.

One object presented in the present disclosure is to provide a communication adapter that can supply a signal and electric power from a bicycle electrical management system to a bicycle electrical system in which a plurality of electric devices can be connected using power line communication.

In view of the state of the known technology, a bicycle communication adapter according to a first aspect is provided that basically comprises a voltage converting component, a signal converting component and a superimposing component. The voltage converting component is configured to convert a received voltage supplied from a bicycle electrical management system to a converted voltage suitable for at least one of a plurality of electric devices of a bicycle electrical system. The signal converting component is configured to convert a received signal outputted from a bicycle electrical management system into a converted signal compliant with a standard for power line communication. The superimposing component is configured to superimpose the converted signal converted by the signal converting component onto the converted voltage converted by the voltage converting component.

The communication adapter receives a signal outputted from the management system through, for example, a communication line and employs the signal converting component to convert the signal into a signal compliant with a power line communication standard. Meanwhile, the communication adapter employs the voltage converting component to convert a voltage of electric power outputted from the management system through, for example an electric power line. The signal converted by the signal converting component is superimposed onto the voltage converted by the voltage converting component. As a result, even if the electric devices of the electrical system do not have a power supply, both signals and electric power can be supplied to the electrical system from the management system. Also, the electric components can be operated even if a voltage that the management system can output is different from a voltage required to operate the electrical components.

A bicycle communication adapter according to a second aspect is provided according to the first aspect, and further comprises an electric energy storage component configured to store electric power supplied from the management system. With this aspect, a stable electric power can be supplied to the electrical system because electric power supplied from the management system can be stored.

A bicycle communication adapter according to a third aspect is provided according to the second aspect, wherein the electric energy storage component is connected between the voltage converting component and the electric devices. With this aspect, the electric power can be stored after the voltage has been converted.

A bicycle communication adapter according to a fourth aspect is provided according to any one of the first to third aspects, and further comprises an electric power source selecting component configured to selectively supply electric power from the voltage converting component to the electric devices in accordance with a state of an electric power source of the bicycle electrical system. With this aspect, the supply of electric power from the adapter can be stopped when, for example, the bicycle electrical system has an electric power supply and the electric devices can be operated without power supplied from the adapter, and electric power whose voltage has been converted by the voltage converting component can be supplied when the bicycle electrical system does not have an electric power supply.

A bicycle communication adapter according to a fifth aspect is provided according to the fourth aspect, wherein the electric power source selecting component has a detecting component configured to detect at least an electric potential or an electric current of the electric devices and the electric power source selecting component supplies electric power from the voltage converting component to the electric components when a detected value is equal to or smaller than a predetermined value. With this aspect, it is easy to determine whether or not it is necessary to supply electric power based on an electric potential or electric current of the electric devices.

A bicycle communication adapter according to a sixth aspect is provided according to any one of the first to fifth aspects, and further comprises an over-current limiting component configured to limit an over-current outputted from the voltage converting component.

A bicycle communication adapter according to a seventh aspect is provided according to any one of the first to sixth aspects, and further comprises two first communication terminals capable of connecting to the bicycle electrical system and a second communication terminal capable of connecting to the management system. Since this aspect features two connection terminals that can connect to the electrical system, the adapter can connect to the bicycle electrical system using only one connection terminal or the adapter can be connected between any two electric devices.

A bicycle communication adapter according to an eight aspect is provided to any one of the first to seventh aspects, wherein the signal converting component is configured to receive from the management system a signal compliant with a universal serial bus (USB) standard. Since the adapter has a power line and a communication line and can connect to the management system with a common USB-compliant connection, a personal computer fitted with a USB port can be used as the management system.

With the present invention, a signal and electric power can be supplied from a management system to a bicycle electrical system even if the electric devices of the bicycle electrical system do not have an electric power source and the management system can manage the bicycle electrical system smoothly.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
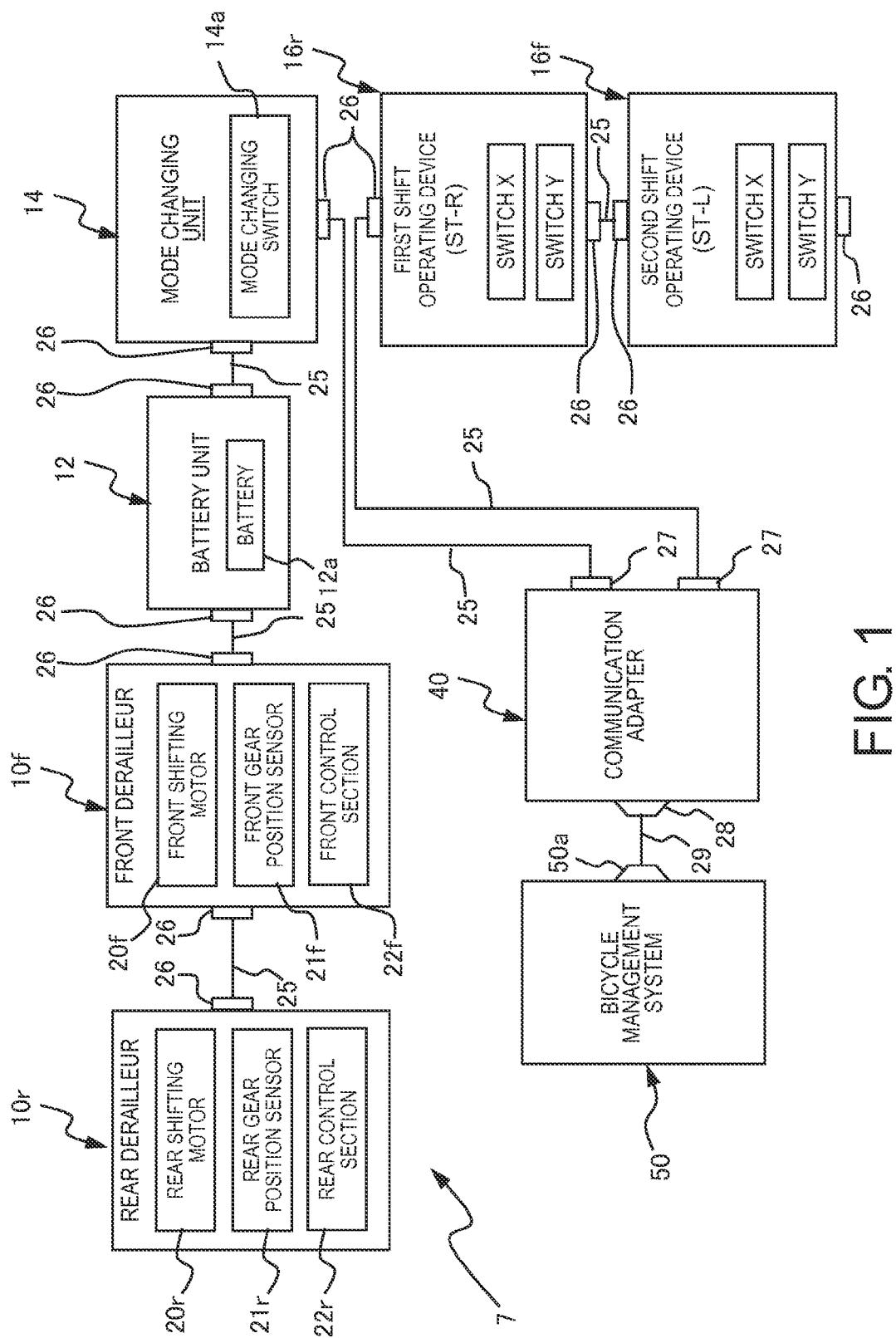
FIG. 1 is a block diagram showing the bicycle communication adapter according to a first embodiment and a management system and a bicycle electrical system connected together with the bicycle communication adapter.

Referring initially to FIG. 1, a bicycle electrical system 7 (hereinafter called "electrical system 7") is illustrated in accordance with a first embodiment. The electrical system 7 is connected to a bicycle management system 50 via a bicycle communication adapter 40 (hereinafter called "communication adapter 40") according to the first embodiment. The electrical system 7 is configured such that it can connect a plurality of electric devices using a power line communication (hereinafter called "PLC") standard. The electrical system 7 has, for example, such PCI compliant electric devices as an electrically drivable rear derailleur 10r, an electrically drivable front derailleur 10f, a battery unit 12, an operating mode changing unit 14, a first shift operating device 16r, and a second shift operating device 16f. Unique identifying information is assigned to each of the electric devices.

The rear derailleur 10r has a rear shifting motor 20r, a rear gear position sensor 21r, and a rear control section 22r. The rear shifting motor 20r is configured to drive a chain guide (not shown) of the rear derailleur 10r in an upshift direction and a downshift direction. The rear gear position sensor 21r is used to position the chain guide at a plurality of shift positions. The rear control section 22r controls the rear shifting motor 20r in response to operations of a switch X and a switch Y (explained later) of the first shift operating device 16r.

The front derailleur 10f has a front shifting motor 20f, a front gear position sensor 21f, and a front control section 22f. The front shifting motor 20f is configured to drive a chain guide (not shown) of the front derailleur 10f in an upshift direction and a downshift direction. The front gear position sensor 21f is used to position the chain guide at a plurality of shift positions. The front control section 22f controls the front shifting motor 20f in response to operations of a switch X and a switch Y (explained later) of the second shift operating device 16f.

The battery unit 12 removably holds a removable battery 12a comprising, for example, a lithium ion battery. The mode changing unit 14 is provided for selecting an operating mode of the electrical system 7 in order to fine adjust the positions of the chain guides of the front derailleur 10f and the rear derailleur 10r with respect to the gears. The mode changing unit 14 has a mode changing switch 14a. An operator can select to operate the electrical system 7 in an adjustment mode by operating the mode changing switch 14a. In the adjustment mode, a position of the chain guide of the rear derailleur 10r can be fine adjusted in an upshift direction or a downshift direction by operating the switch X or the switch Y (explained later) of the first shift operating device 16r. Also, in the adjustment mode, a position of the chain guide of the front derailleur 10f can be fine adjusted in an upshift direction or a downshift direction by operating the switch X or the switch Y (explained later) of the second shift operating device 16f.

The first shift operating device 16r has a switch X and a switch Y used for executing a shift operation of the rear derailleur 10r. The second shift operating device 16f has a switch X and a switch Y used for executing a shift operation of the front derailleur 10f. The switch X and the switch Y of the first shift operating device 16r are provided, for example, on a brake lever for operating a front brake or on a bracket of the brake lever. The switch X and the switch Y of the second shift operating device 16f are provided, for example, on a brake lever for operating a rear brake or on a bracket of the brake lever.

These electric devices are connected with a power communication line 25. A communication terminal 26 configured such that connectors provided on both ends of the power communication line 25 can be connected thereto is mounted on each of the electric devices. The communication terminal 26 is, for example, a two-conductor female connector. Only one communication terminal 26 is provided on an electric device (e.g., the rear derailleur 10r) located at a terminal end of the electrical system 7 and two are provided on the other electric devices. It is also acceptable to provide two communication terminals 26 on the electric device located at the terminal end. For example, in this embodiment, two communication terminals 26 are provided on the second shift operating device 16f located at a terminal end of the electrical system. Additionally, when a shift switch of a different type than the first and second shift operating devices is installed as an electric device, the shift switch can be added to the electrical system by connecting it to an unused terminal 26 of the second shift operating device 16f using the power communication line 25.

In FIG. 1 the communication adapter 40 is connected between the mode changing unit 14 and the first shift operating device 16r. However, when the communication adapter 40 is removed and the electrical system 7 is in a normal state, the mode changing unit 14 and the first shift operating device 16r are directly connected together using the power communication line 25.

Figure 2:
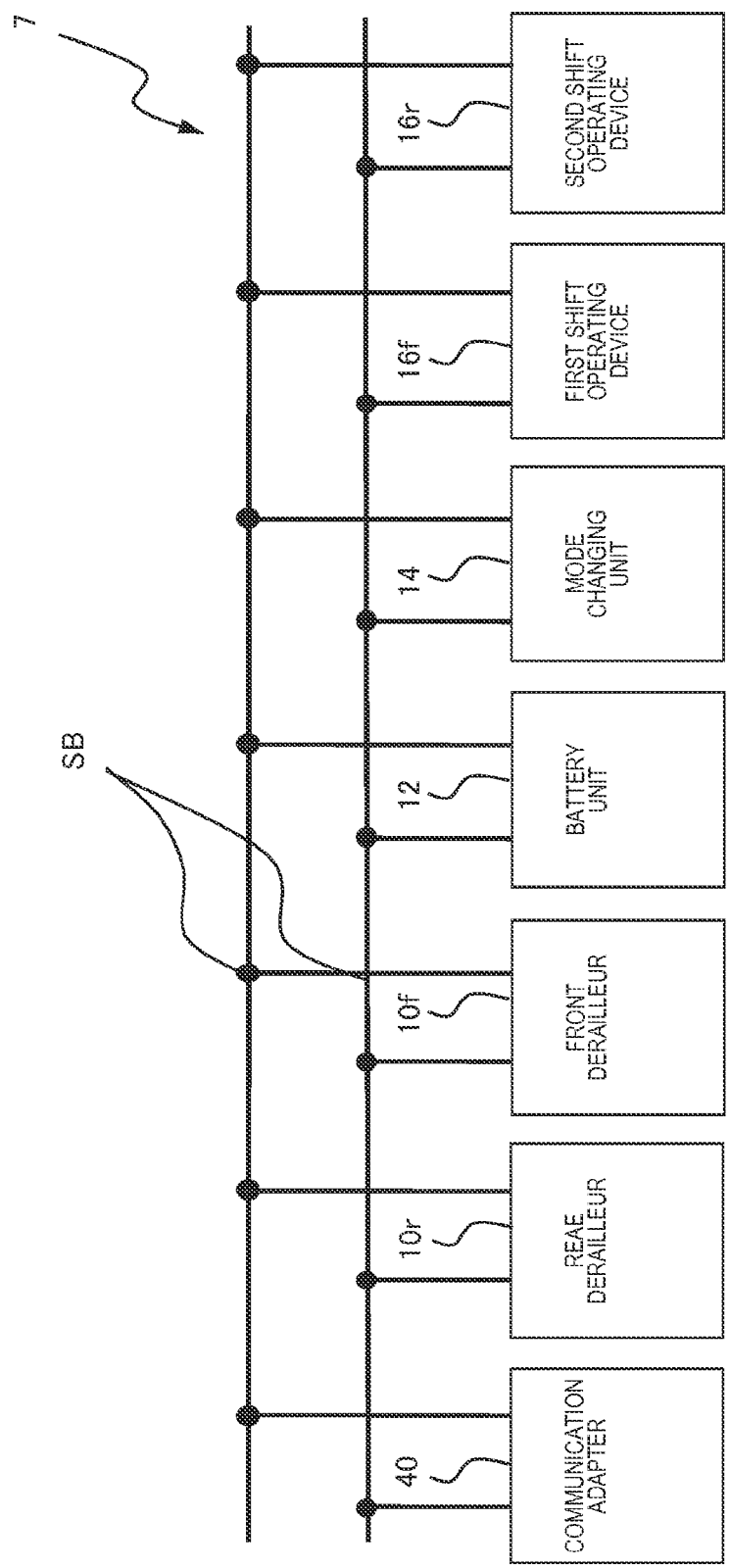
FIG. 2 is a block diagram of a bus connection structure of a bicycle electrical system.

As shown in FIG. 2, each of the electric devices is connected to a serial bus structure. As shown in FIG. 2, a social bus SB is also provided inside the electric devices and, if a communication adapter 40 is provided, the serial bus SB is made up of the communication adapter 40, the electric devices, and the power communication line 25. As a result, regardless of whether any of the electric components is connected or disconnected, an electric component can operate so long as it is connected to the power communication line 25. For example, in FIG. 1, even if the communication adapter 40 and the mode changing unit 14 are disconnected, the electric system 7 will operate because the battery unit 12 and the first shift operating device 16r are connected together by the power communication line 25. Also, if, for example, the front derailleur 10f is operated with a regular shift cable, then it is acceptable for the battery unit 12 and the rear derailleur 10r to be connected by the electric power communication line 25. In this case, too, the electrical system 7 will operate.

The management system 50 comprises, for example, a personal computer (hereinafter called "PC") having a USB input/output terminal 50a (e.g., a USB type A female connector). The management system 50 uses management software stored inside the PC to execute failure testing of the electric devices, settings of the electric devices, and such management processing as updating the firmware of the electric devices.

As shown in FIG. 1, the communication adapter 40 according to the first embodiment of the present invention can be connected to the communication system 50 using a USB cable 29 having two communication lines and two electric power lines. The communication adapter 40 has two first communication terminals 27 for power line communication and a second communication terminal 28 that can communicate with the management system 50. The first communication terminals 27 are of the same specifications as the communication terminals 26 of the electric devices. The second communication terminal 28 comprises, for example, a USB type B female connector. By providing two first communication terminals 27, the communication adapter 40 can be connected between any two electric devices of the electrical system 7. For example, although in FIG. 1 the communication adapter 40 is connected between the mode changing unit 14 and the first shift operating device 16r, the communication adapter 40 can be connected between the battery unit 12 and the front derailleur 10f or between any other two electric devices.

Figure 3:
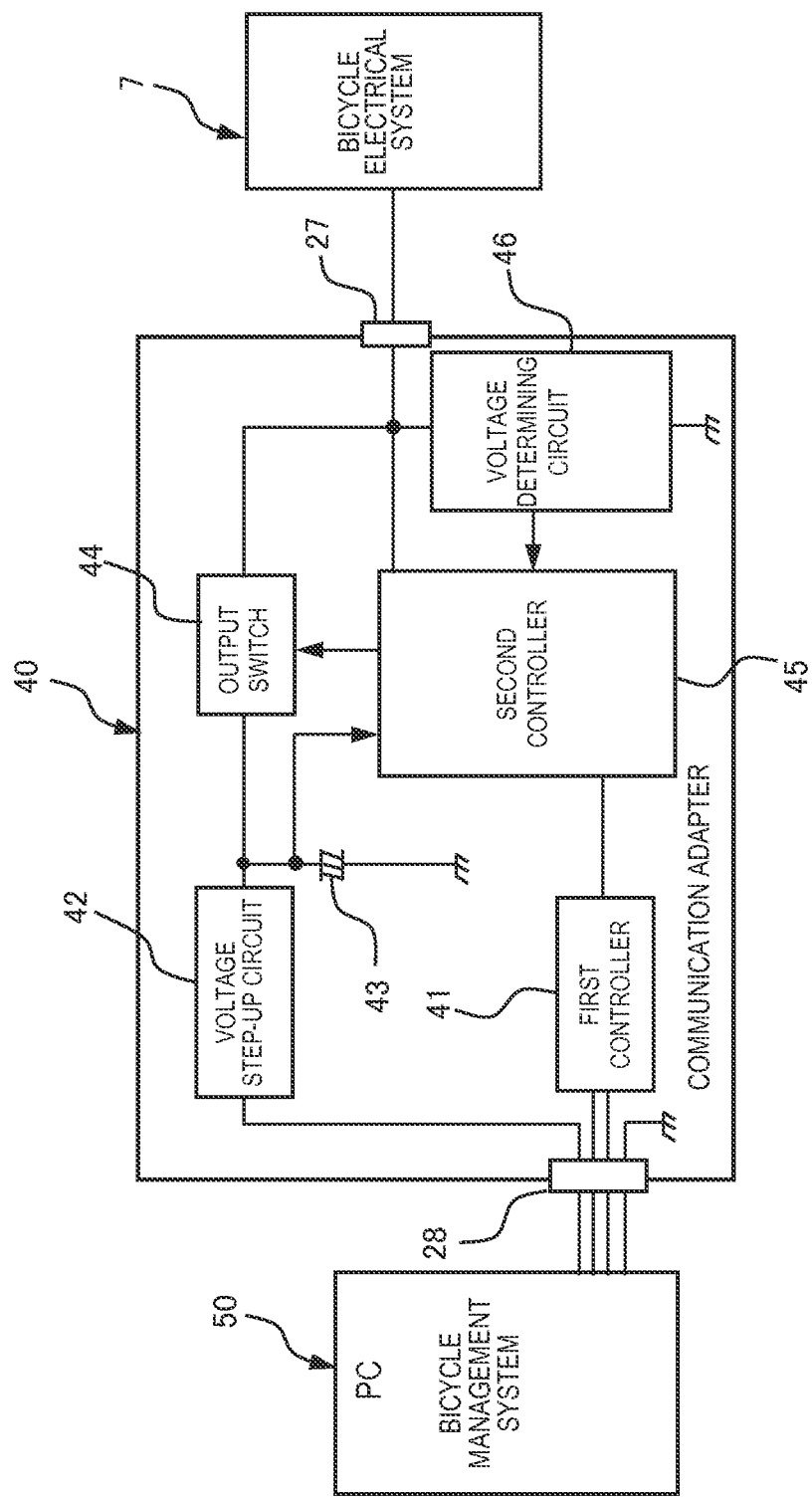
FIG. 3 a block diagram showing constituent features of the bicycle communication adapter in accordance with the first embodiment.

As shown in FIG. 3, the communication adapter 40 comprises a first controller 41, a voltage step-up circuit 42, an electric energy storage element 43, an output switch 44, a second controller 45 and a voltage determining circuit 46. The first controller 41 is connected to a signal line terminal of the second communication terminal 28. The first controller 41 receives serial data outputted through the USB cable 29 from the management system 50 in a PC communication format and transmits the serial data to the second controller 45.

The voltage step-up circuit 42 is connected to an electric power line terminal of the second communication terminal 28. The voltage step-up circuit 42 raises a voltage outputted from the management system 50 through an electric power line of the USB cable 29 to a voltage corresponding to the electrical system 7. For example, the voltage step-up circuit 42 raises a 5-V voltage outputted from the management system through the USB cable 29 to a 6-V to 9-V voltage used by the rear shifting motor 20r and the front shifting motor 20f. The voltage step-up circuit 42 is an example of a voltage converting component.

One end of the electric energy storage element 43 is connected to the voltage step-up circuit 42 and the other end is connected to ground. The electric energy storage element 43 is, for example, an electric double-layer capacitor or other large capacity capacitor. The electric energy storage element 43 is provided to operate electric actuators, such as the rear shifting motor 20r and the front shifting motor 20f, that required a larger current than the current limit of the USB standard allows. The electric energy storage element 43 is connected to an output side of the voltage step-up circuit 42. The output switch 44 is connected to an output side of the voltage step-up circuit 42 and the electric energy storage element 43. The electric energy storage element 43 is an example of an electric energy storage component.

The output switch 44 serves to turn a supply of electric power from the electric energy storage element 43 to the electric system 7 on and off.

The second controller 45 converts each of the communication output signals into PLC compliant signals and transmits them to the electrical system 7. The second controller 45 is an example of a signal converting component. The second controller 45 also turns the output switch 44 on and off according to a determination result of the voltage determining circuit 46 and checks a state of charge of the electric energy storing element 43 before executing a command issued from the management system 50 instructing the second controller 45 to operate an electric actuator. The second controller 45 outputs a signal indicating the command after it has confirmed that the state of charge is sufficient.

The voltage determining circuit 46 is provided to determine if an electric power should be supplied to the electrical system 7. The voltage determining circuit 46 is an example of an electric power source selecting component. More specifically, the voltage determining circuit 46 determines if it is necessary to supply electric power by determining if a voltage of an electric power communication line inside the electrical system 7 is lower than a prescribed threshold value when the communication adapter 40 is connected to the management system 50 and the electrical system 7. If the voltage determining circuit 46 determines that the voltage of the electrical system 7 is lower than the prescribed threshold value, then the second controller 45 checks the state of charge of the electric energy storage element 43 and turns the output switch 44 on if it confirms that the state of charge is sufficient. It is preferable for the output switch 44 to turn on only when the voltage of the electrical system 7 is zero or substantially zero.

When the output switch 44 is on, the second controller 45 superimposes the PLC compliant signal with the raised voltage from the voltage step-up circuit 42 and outputs the resulting signal to the first communication terminal 27. The second controller 45 functions as a superimposing component. Even when the output switch 44 is not on, the second controller 45 superimposes the PLC compliant signal onto the voltage supplied to the first communication terminal 27 through the power communication line 25 if a voltage of an electric power source of the electrical system 7 is sufficient.

With such a communication adapter 40, when the management system 50 issues a command that is not for operating an electric actuator (e.g., a command for checking the operation of the switch X and the switch Y of the second shifting device 16f), the communication adapter 40 converts the command into a PLC compliant signal, superimposes the signal with a voltage, and outputs superimposed voltage to the electrical system 7.

Meanwhile, when the management system 50 issues a command that is for operating an electric actuator, the communication adapter 40 checks the state of charge of the electric energy storage element 43 before transmitting the command. Then, if the state of charge is sufficient, the communication adapter 40 superimposes a PLC compliant signal corresponding to the command onto a voltage and outputs the voltage to the electrical system 7.

In the communication adapter 40, a signal received from the management system 50 through, for example, a USB cable 29 is converted into a PLC compliant signal by the second controller 45. Meanwhile, a voltage of electric power received from the management system 50 through, for example, an electric power line is raised by the voltage step-up circuit 42 to a voltage that the electrical system 7 can use. The converted signal produced by the second controller 45 is then superimposed onto the raised voltage produced by the voltage step-up circuit 42. As a result, even if an electric device(s) of the electrical system 7 does not have a power supply, both signals and electric power can be supplied to the electrical system 7 from the management system 50. Also, even if the voltage that the management system 50 can deliver is different from the voltage necessary to operate the electric devices of the electrical system 7, using the communication adapter 40 enables each of the electric devices to be operated smoothly.

The electric energy storage element 43 enables the communication adapter 40 to produce a large current momentarily. Thus, an electric device having an electric actuator or other electrical component that requires a large current can be operated smoothly even if electric power supplied directly from the management system 50 would not be sufficient to operate the electric device in a stable manner.

Second Embodiment

Figure 4:
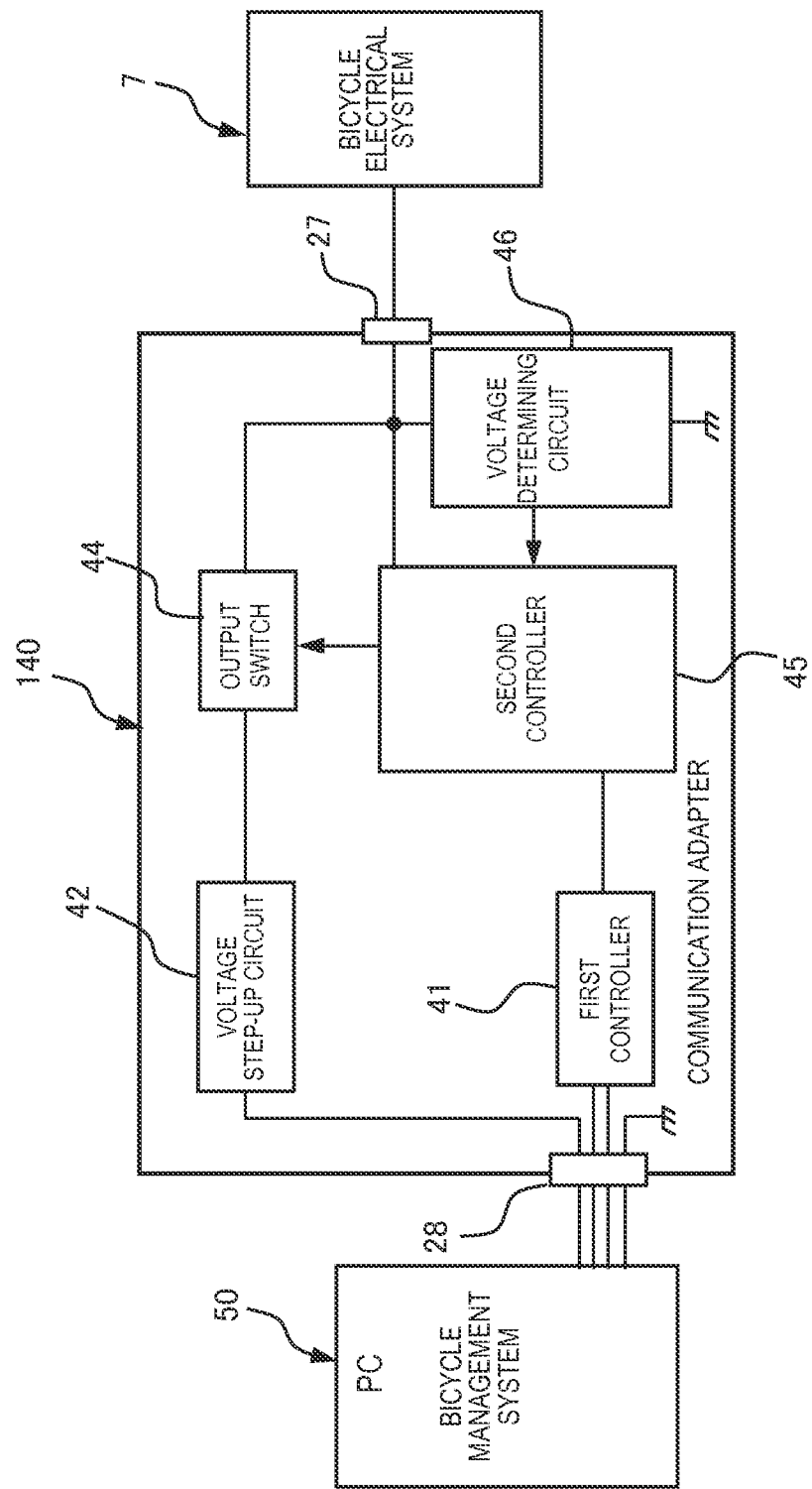
FIG. 4 is a block diagram corresponding to FIG. 2 of a bicycle communication adapter in accordance with a second embodiment.

Although the communication adapter 40 of the first embodiment has an electric energy storage element 43, the communication adapter 140 of a second embodiment does not have an electric energy storage element, as shown in FIG. 4. Otherwise, the constituent features of the communication adapter 140 are the same as those of the communication adapter 40. When the electric devices connected do not require a large momentary current, the second embodiment enables a simpler configuration to be achieved.

Third Embodiment

Figure 5:
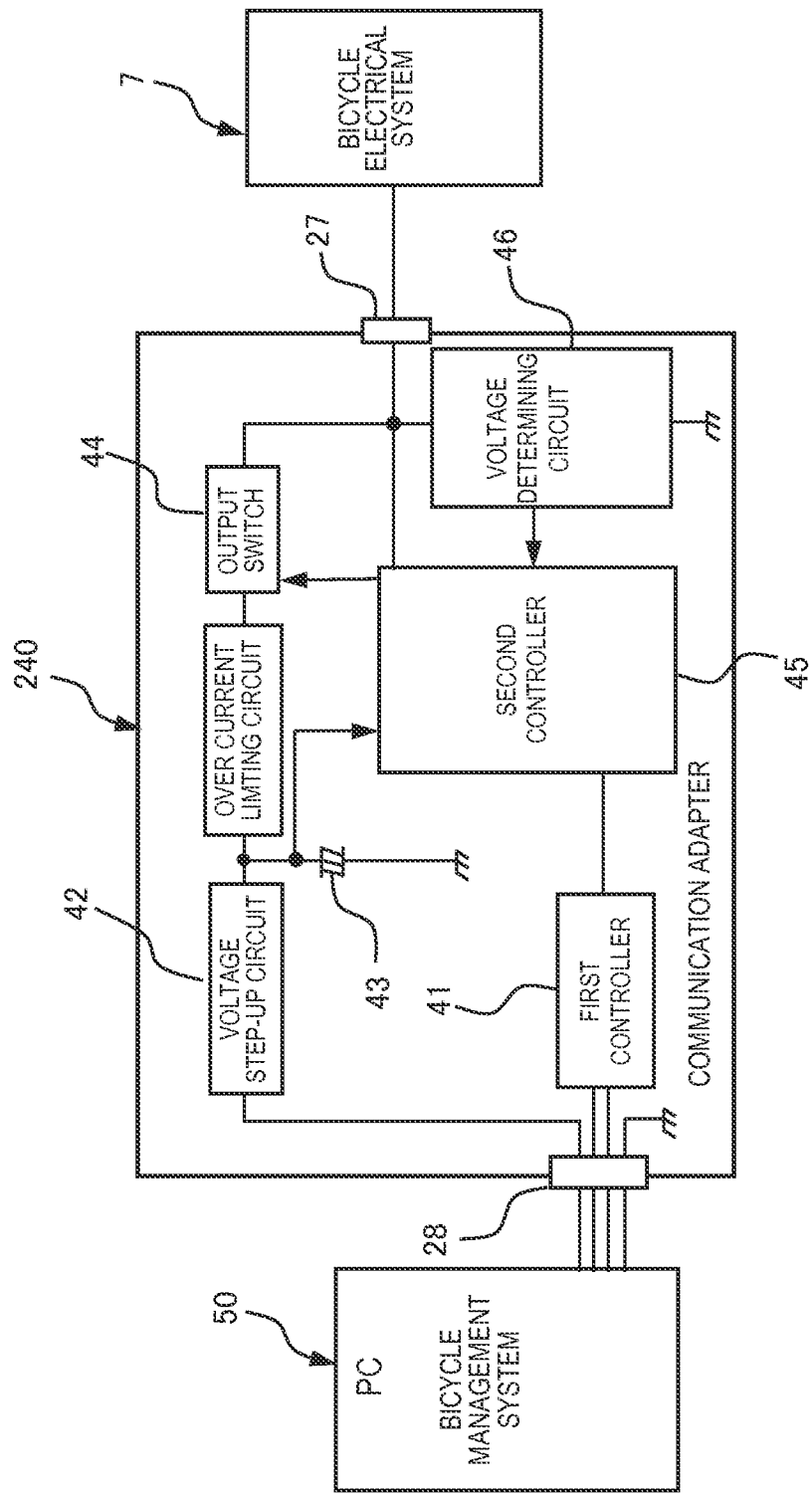
FIG. 5 is a block diagram corresponding to FIG. 2 of a bicycle communication adapter in accordance with a third embodiment.

The communication adapter 240 of a third embodiment has an over-current limiting circuit 48 connected between the voltage step-up circuit 42 and the output switch 44 as shown in FIG. 5. Otherwise, the constituent features of the communication adapter 240 are the same as those of the communication adapter 40. The over-current limiting circuit 48 limits current such that an excessive current will not flow from the electric energy storage element 43 to the electrical system 7. Providing the over-current limiting circuit 48 helps prevent a large current from flowing to the electrical system 7 when the electrical system 7 has a short circuit failure. The current limit value imposed by the over-current limiting circuit 48 is set, for example, in accordance with a rated value of the power communication line or a rated value of the electric power actuator.

Other Embodiments

While only selected embodiments have been chosen to illustrate the present invention, it will be apparent to those skilled in the art from this disclosure that various changes and modifications can be made herein without departing from the scope of the invention as defined in the appended claims.

Although in the previously explained embodiments the communication adapter 40 has two first communication terminals 27, it is acceptable so long as there is at least one first communication terminal 27. When there is one communication terminal, the communication adapter 40 should be connected, for example, to the communication terminal of the second shifting device 16*f* that is not being used.

Although the previously explained embodiments use a USB compliant communication standard that can supply electric power, it is acceptable for electric power and signals to be delivered from the management system to the communication adapter using separate standards.

Although in the previously explained embodiments a determination of whether it is necessary to supply electric power to the electric devices of the electric system 7 is based on voltage, it is acceptable to make the determination based on electric current.

Although in the previously explained embodiments the electric energy storage component is a large-capacity capacitor, the present invention is not limited to such an electric energy storage component. For example, it is acceptable to use a secondary battery.

Also components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle communication adapter comprising:
   a voltage converting component configured to convert a received voltage supplied from a bicycle electrical management system to a converted voltage suitable for at least one of a plurality of electric devices of a bicycle electrical system;
   a signal converting component configured to convert a received signal outputted from a bicycle electrical management system into a converted signal compliant with a standard for power line communication;
   a superimposing component configured to superimpose the converted signal converted by the signal converting component onto the converted voltage converted by the voltage converting component; and
   an electric energy storage component configured to store electric power supplied from the bicycle electrical management system, the electric energy storage component being electrically connected to the voltage converting component and arranged to be located between the voltage converting component and the electric devices of the bicycle electrical system while the bicycle communication adapter is connected to the bicycle electrical system.

2. The bicycle communication adapter as recited in claim 1, further comprising
   a power source selecting component configured to selectively supply electric power outputted from the voltage converting component to the electric devices in accordance with a state of a power source of the bicycle electrical system while the bicycle communication adapter is connected to the bicycle electrical system.

3. The bicycle communication adapter as recited in claim 2, wherein
   the power source selecting component has a detecting component configured to detect at least one of an electric potential of the electric devices and an electric current of the electric devices as a detected value; and the power source selecting component supplies electric power from the voltage converting component to the electric devices upon determining the detected value is equal to or smaller than a predetermined value.

4. The bicycle communication adapter as recited in claim 3, further comprising an over-current limiting component configured to limit an over-current outputted from the voltage converting component.

5. The bicycle communication adapter as recited in claim 4, further comprising:

a pair of first communication terminals configured to be connected to the bicycle electrical system; and a second communication terminal configured to be connected to the bicycle electrical management system.

6. The bicycle communication adapter as recited in claim 5, wherein the signal converting component receives the received signal as a signal compliant with a universal serial bus standard from the bicycle electrical management system.

7. The bicycle communication adapter as recited in claim 1, further comprising an over-current limiting component configured to limit an over-current outputted from the voltage converting component.

8. The bicycle communication adapter as recited in claim 1, further comprising:

a pair of first communication terminals configured to be connected to the bicycle electrical system; and a second communication terminal configured to be connected to the bicycle electrical management system.

9. The bicycle communication adapter as recited in claim 1, wherein the signal converting component receives the received signal as a signal compliant with a universal serial bus standard from the bicycle electrical management system.

* * * * *